United States Patent [19]
Jesensky et al.

[11] 3,981,574
[45] Sept. 21, 1976

[54] OPTICAL DEVICE

[75] Inventors: Alexander Jesensky, Barrington; Frederick D. Meller, Lombard; Robert C. Patzke, Prospect Heights; Gilbert W. Willey, Barrington, all of Ill.

[73] Assignee: Addressograph Multigraph Corporation, Cleveland, Ohio

[22] Filed: Dec. 17, 1973

[21] Appl. No.: 425,511

[52] U.S. Cl. .................................. 353/101; 353/81; 353/27 R
[51] Int. Cl.² .................................... G03B 3/00
[58] Field of Search ............................ 353/25–27, 353/101, 81; 350/287; 355/45, 44, 66

[56] References Cited
UNITED STATES PATENTS

| | | | |
|---|---|---|---|
| 2,029,938 | 2/1936 | Newman | 353/101 |
| 2,503,714 | 4/1950 | Eagle et al. | 353/101 |
| 2,548,554 | 4/1951 | Nivison et al. | 353/81 |
| 2,878,718 | 3/1959 | Post | 353/76 |
| 2,911,884 | 11/1959 | Caudle et al. | 353/27 |
| 2,933,978 | 4/1960 | Rosenthal | 353/81 |
| 3,463,585 | 8/1969 | Levine | 355/45 |
| 3,547,531 | 12/1970 | Wells | 353/76 |
| 3,582,203 | 6/1971 | Cox | 353/81 |
| 3,649,119 | 3/1972 | Rempala et al. | 355/45 |
| 3,762,810 | 10/1973 | Kinsinger et al. | 353/25 |

Primary Examiner—Harry N. Haroian
Attorney, Agent, or Firm—Mason, Kolehmainen, Rathburn & Wyss

[57] ABSTRACT

An optical device for a micro-image viewer or a micro-image viewer-printer machine receives a projected image of an illuminated micro-image, adjusts the spatial disposition of the projected image in an image plane and transmits the adjusted projected image to a viewing screen for viewing or to an exposure station for reproduction purposes. The optical device, in a preferred embodiment, includes a pechan prism positioned in a micro-image viewer-printer machine for receiving a projected image from a projection lens assembly. The pechan prism is rotatable about the illumination path or optical axis of the viewer-printer machine to enable the spatial disposition of the projected image to be rotated at least from 0° to 180° in an image plane. The pechan prism is mounted in the optical axis of the viewer-printer machine by a novel mounting assembly that enables both the conrollable rotational movement of the pechan prism about the optical axis and the controllable longitudinal movement of the pechan prism along the optical axis. Additionally, the novel mounting assembly enables the pivotal movement of the pechan prism into and out of the optical axis to provide access to the projection lens assembly for the adjustment, repair, removal and replacement of the projection lens assembly.

16 Claims, 16 Drawing Figures

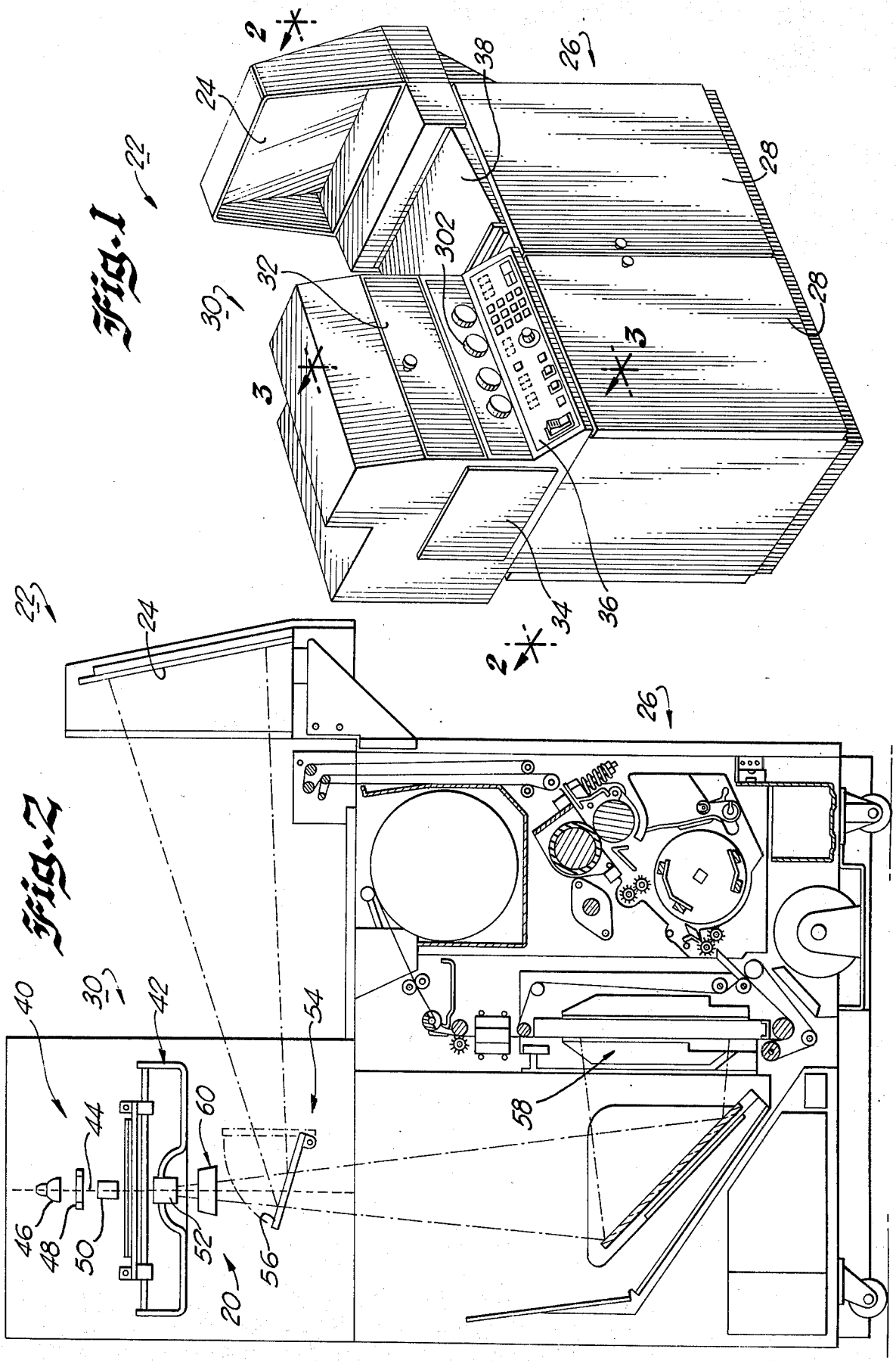

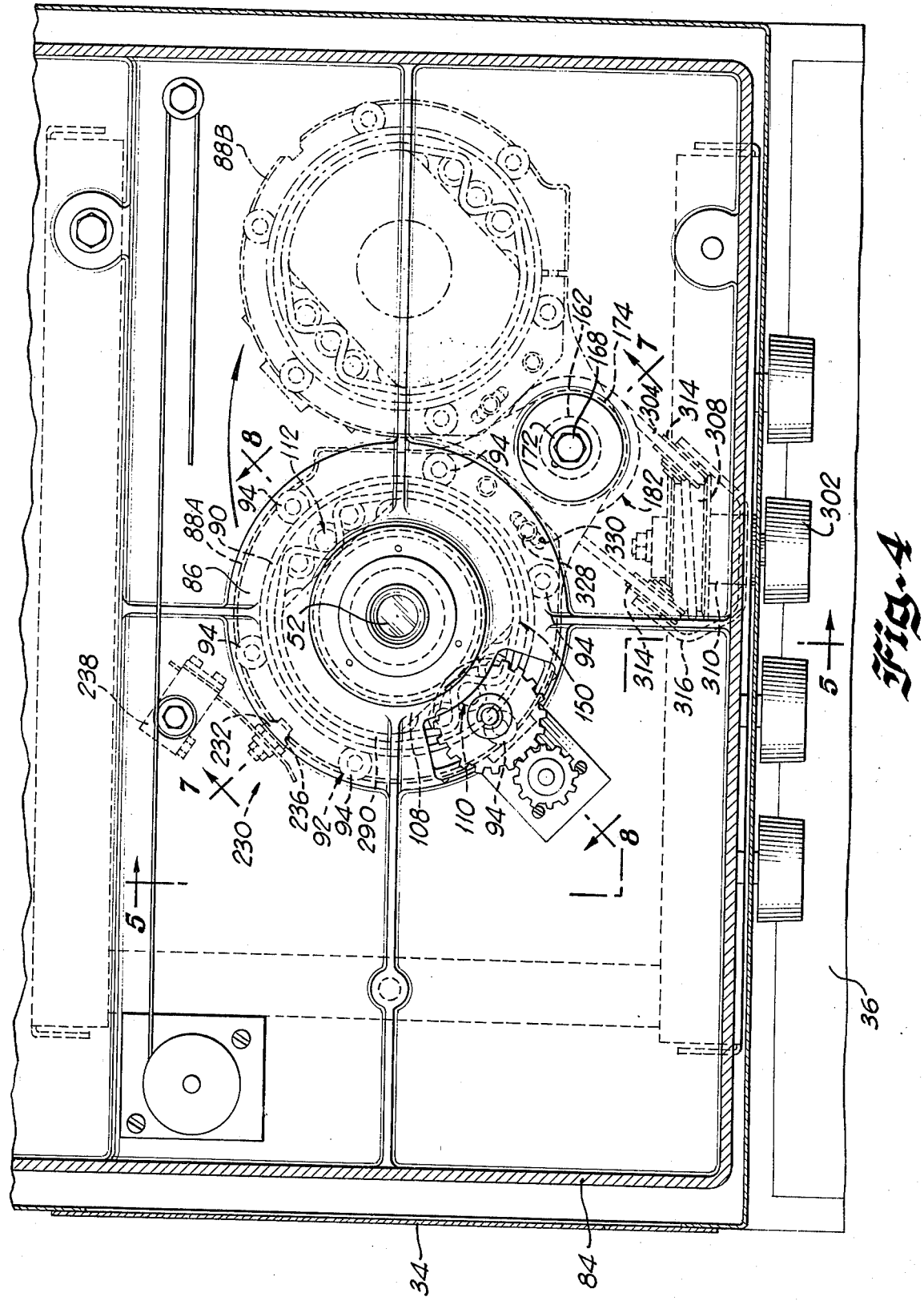

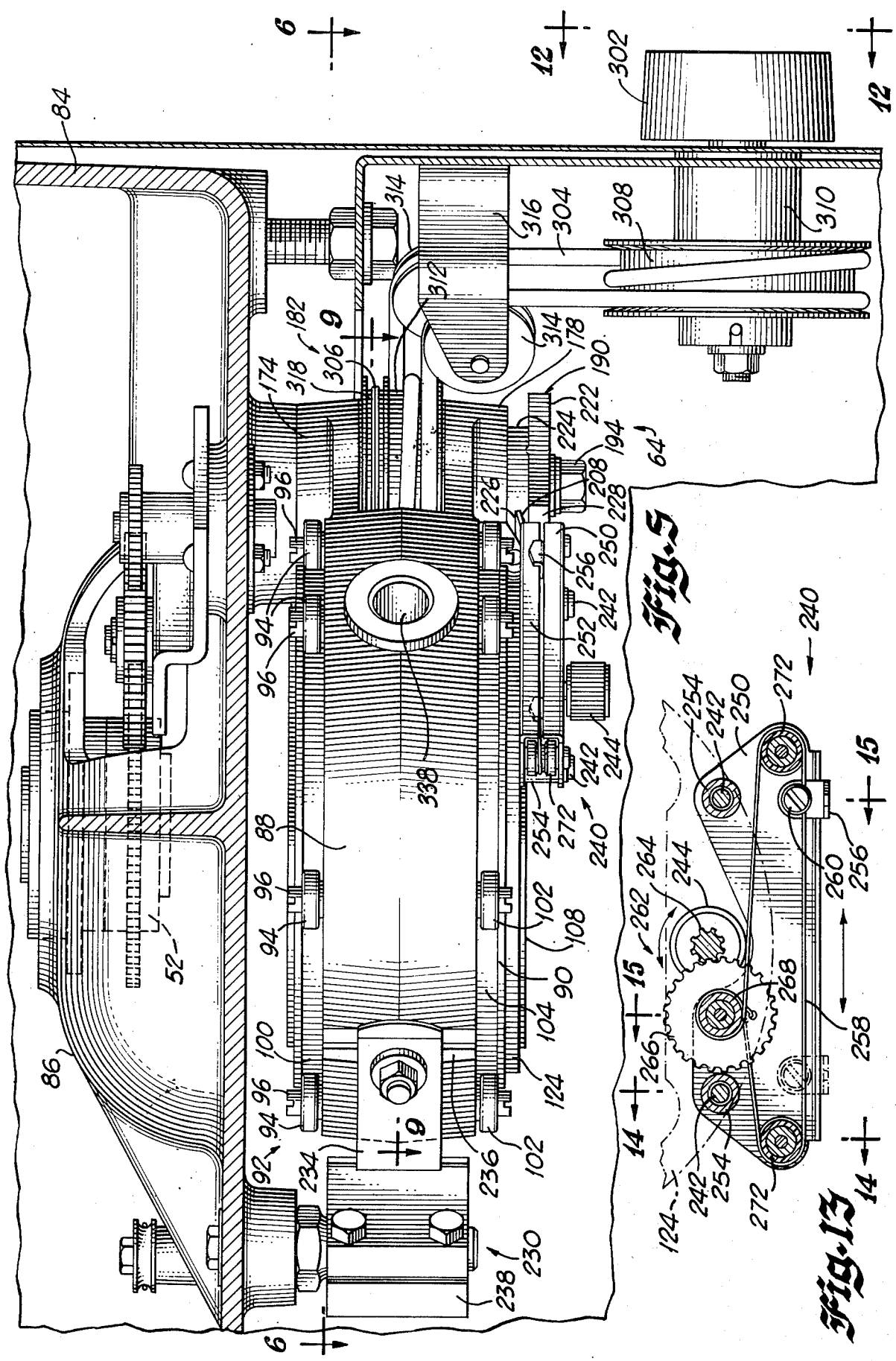

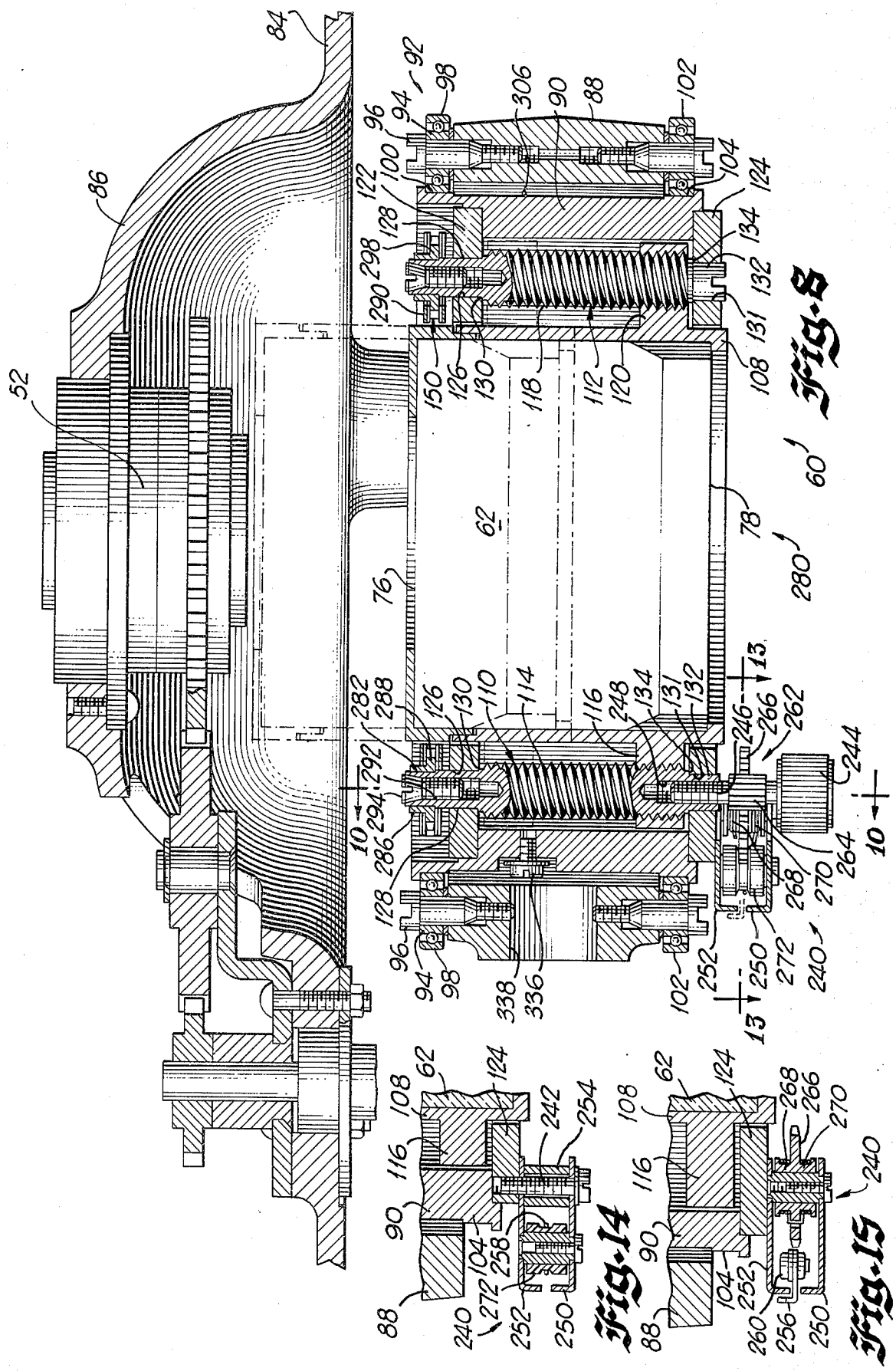

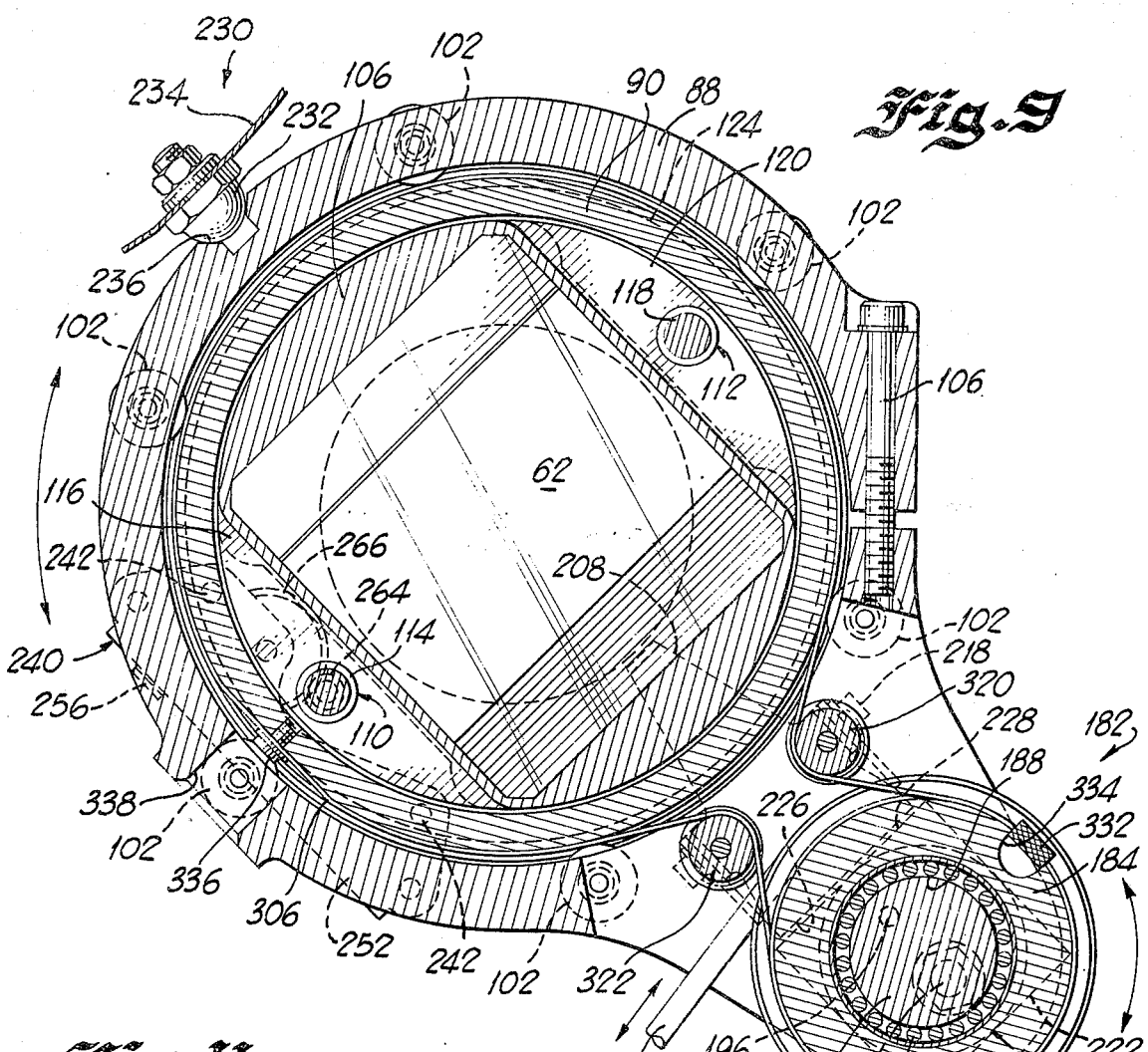
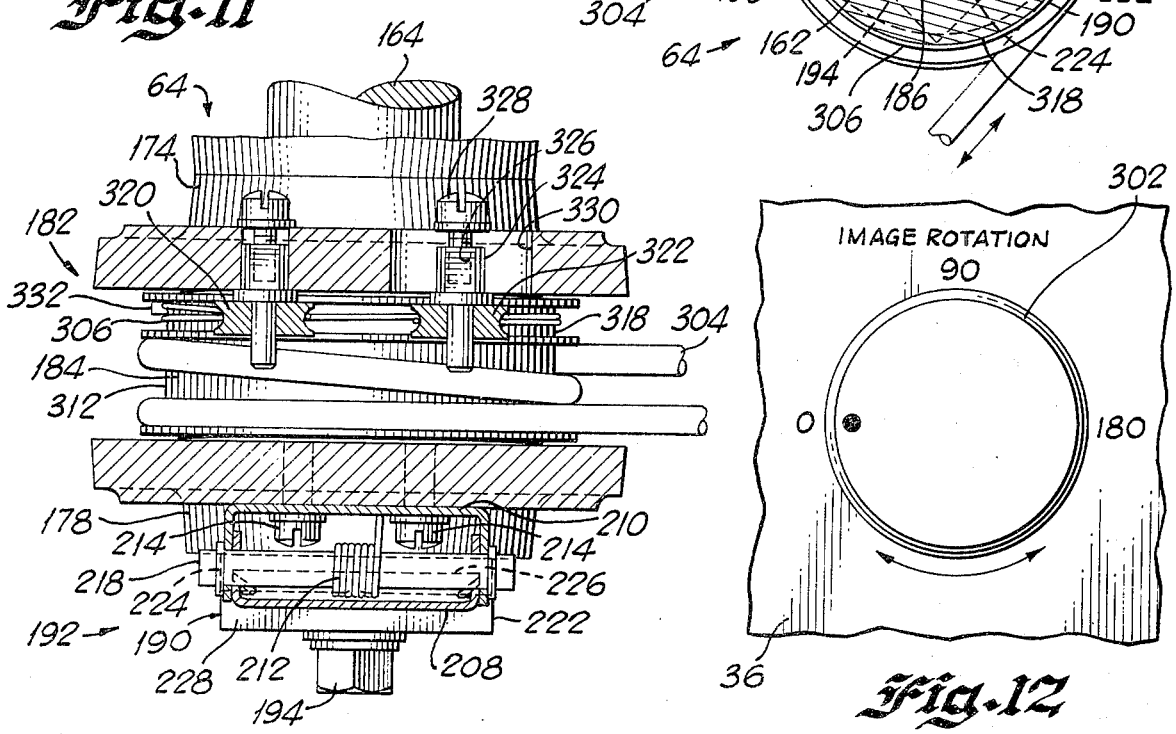

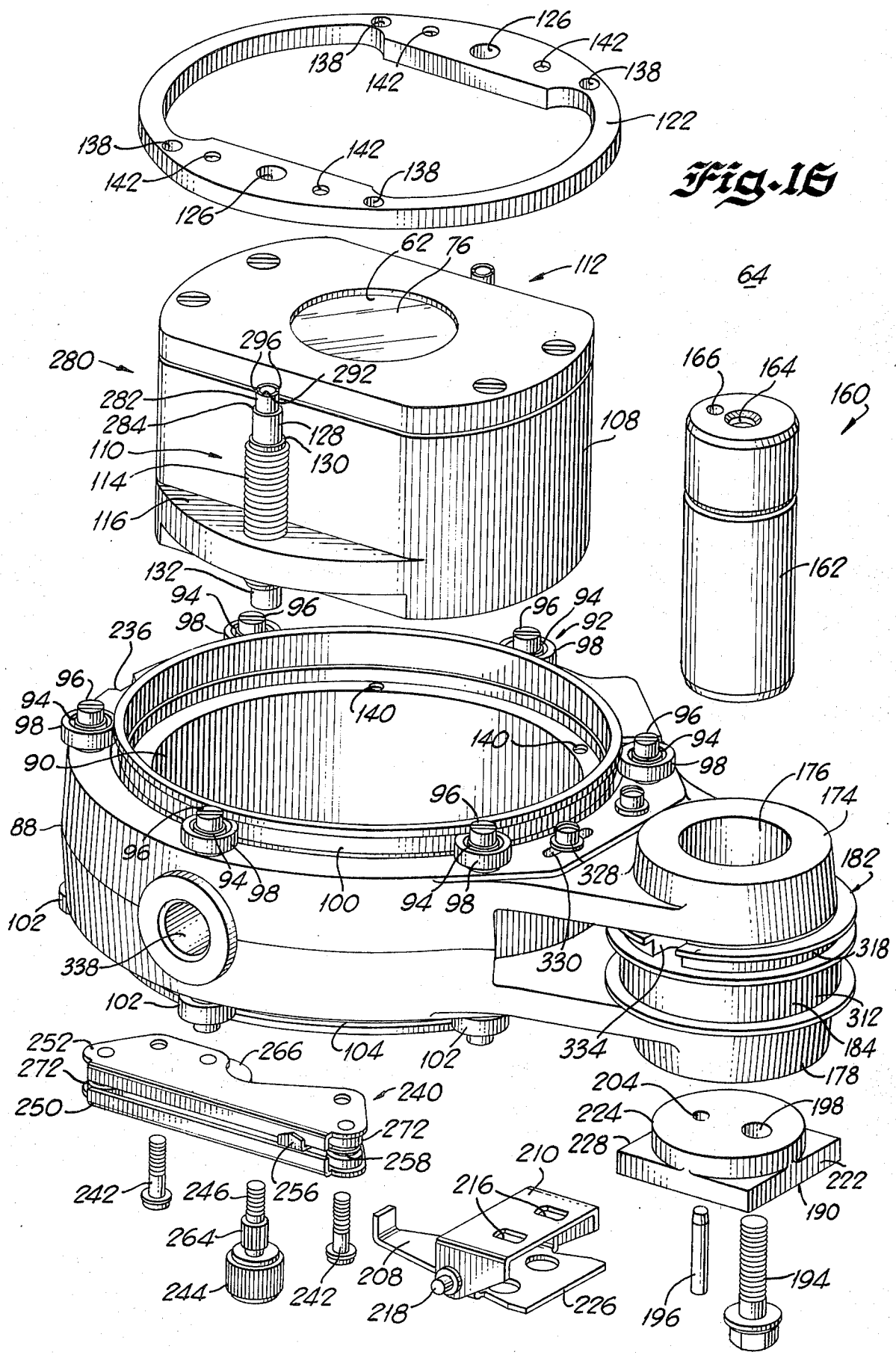

OPTICAL DEVICE

CROSS-REFERENCES TO RELATED APPLICATIONS

The present invention is related to the inventions disclosed in U.S. Pat. applications Ser. Nos. 388,814 (Inventors Jesensky and Meller); 388,838 (Inventors — Aronson, DeRyke, and Goebel); 388,963 (Inventors — Patzke and Goebel); 389,025 (Inventor — Goebel); and 389,026 (Inventors — Raterman and Goebel), all of which were filed on Aug. 16, 1973 and all of which are assigned to the same assignee as the assignee of the present invention. The complete disclosures of the above-mentioned five co-pending United States patent applications are hereby incorporated herein by reference.

BACKGROUND OF THE INVENTION

A. Field of the Invention

The device of the present invention generally relates to optical devices and, more specifically, to a new and improved optical device especially adapted for use in a micro-image viewer-printer machine for rotating the image position of a projected image in an image plane at least in the range of from 0 degrees to 180 degrees.

B. Description of the Prior Art

Information storage in the form of micro-images disposed on microfilm or microfiches has become quite commonplace. Filing space is drastically reduced with the storage of information in this manner. However, the storage of information in this manner is only acceptable if the information stored is quickly and easily retrievable. The information stored must be capable of being retrieved by the projection of the micro-images onto a viewing screen for viewing and study and, in many cases, by the projection of the micro-images to an exposure station of printing or reproduction apparatus for the rapid reproduction of enlarged paper copies of the micro-images.

The prior art includes many suitable micro-image viewer-printer machines. While such viewer-printer machines are capable of projecting micro-images to a viewing screen for viewing or study and of projecting a micro-image to an exposure station for reproduction purposes, the image position of the projected image as displayed on the viewing screen or as transferred to the exposure station may not conform to the desired image position. For example, as viewed on the viewing screen, the projected image may have its actual longitudinal axis disposed at an angle of from 0° to 360° from the desired position of the longitudinal axis of the projected image. In order to provide for optimum viewing, study, or reproduction, it may be desirable to angularly adjust or rotate the longitudinal axis of the projected image from its initial position to a desired position.

Summary of the Invention

An object of the present invention is to provide a new and improved optical device.

Another object of the present invention is to provide a new and improved optical device for adjusting the image position of a projected image.

Another object of the present invention is to provide a new and improved optical device for adjusting the image position of a projected image in a micro-image viewer or a micro-image viewer-printer machine to conform with a desired image position.

Another object of the present invention is to provide a new and improved optical device positioned in an optical axis of a micro-image viewer or a micro-image viewer-printer machine for angularly adjusting or rotating the image position of a projected iamge at least through an angular range of from 0° to 180°.

Another object of the present invention is to provide a new and improved device for mounting a pechan prism in the optical axis or illumination path of a micro-image viewer or a micro-image viewer-printer machine to enable the pechan prism to be rotated about an axis of rotation colinearly disposed with respect to the optical axis of the micro-image viewer or the micro-image viewer-printer machine.

Another object of the present invention is to provide a new and improved device for mounting a pechan prism in an optical axis of a micro-image viewer or a micro-image viewer-printer machine to enable the position of the pechan prism to be longitudinally adjusted along the optical axis.

Another object of the present invention is to provide a new and improved device for mounting a pechan prism in an optical axis of a micro-image viewer or micro-image viewer-printer machine for receiving a projected image of a micro-image from a projection lens assembly and for enabling the pechan prism to be easily moved out of the optical axis to thereby provide access for the adjustment, repair, removal and replacement of the projection lens assembly.

Briefly, the device of the present invention comprises an optical device for adjusting the image position of a projected image. More specifically, the device of the present invention is directed to a new and improved optical device in which a pechan prism is positioned in the illumination path or optical axis of a micro-image viewer or a micro-image viewer-printer machine.

The device of the present invention is particularly adapted for inclusion in the optical axis of the micro-image viewer-printer machine disclosed in the above-identified five co-pending patent applications and comprises a pechan prism assembly for receiving the projected image of a micro-image from a projection lens assembly of the machine. The pechan prism assembly enables an operator to angularly adjust or rotate the image position of a projected micro-image through at least an angular range of 0° to 180°. Since the axis of rotation of the pechan prism is fixed to be coincident with the optical axis of the micro-image viewer or of the micro-image viewer-printer machine, rotation of the pechan prism through a predetermined angle of rotation causes the image position of the projected micro-image to be rotated through twice that angle of rotation.

The pechan prism assembly additionally advantageously mounts the pechan prism in the optical axis in such a manner as to permit the controlled longitudinal displacement of the pechan prism along the optical axis. Thus, the pechan prism assembly may be used with projection lens assemblies of varying physical lengths. The pechan prism assembly also mounts the pechan prism for pivotal movement into or out of the optical axis to permit the adjustment, repair, removal or replacement of the projection lens assembly. In addition to enabling the image position of a projected image to be rotated, the pechan prism assembly advantageously provides a very long optical path in relation to its physical dimensions to thereby enable the micro-image viewer and the micro-image viewer-printer machine to be encased in compact enclosures.

BRIEF DESCRIPTION OF THE DRAWING

The above and other objects and advantages and novel features of the present invention will become apparent from the following detailed description of a preferred embodiment of the invention illustrated in the accompanied drawing wherein:

FIG. 1 is a front, perspective view of a micro-image viewer-printer machine that utilizes the device of the present invention;

FIG. 2 is a partially-diagramatic and partially-cross-sectional view of the machine illustrated in FIG. 1, taken along line 2—2 of FIG. 1;

FIG. 4 is an enlarged plan view of the device of the present invention taken along line 4—4 of FIG. 3;

FIG. 5 is an enlarged, fragmentary, elevational view of the device of the present invention taken from line 5—5 of FIG. 4;

FIG. 8 is an enlarged, partially-elevational and partially cross-sectional view of the device of the present invention taken along line 8—8 of FIG. 4;

FIG. 9 is a cross-sectional view of the device of the present invention taken along line 9—9 of FIG. 5;

FIG. 11 is a detailed, cross-sectional view of the device of the present invention taken along line 11—11 of FIG. 7;

FIG. 12 is a fragmentary, detailed, front view of a portion of the device of the present invention taken from line 12—12 of FIG. 5;

FIG. 13 is an enlarged, detailed, plan view of a portion of the device of the present invention taken from line 13—13 of FIG. 8;

FIG. 14 is an enlarged, fragmentary, cross-sectional view of a portion of the device of the present invention taken along line 14—14 of FIG. 13;

FIG. 15 is an enlarged, fragmentary, cross-sectional view of a portion of the device of the present invention taken along line 15—15 of FIG. 13; and FIG. 16 is an enlarged, exploded, perspective view of the device of the present invention.

DESCRIPTION OF THE PREFERRED EMBODIMENT

1. General Environment

Figure 3:
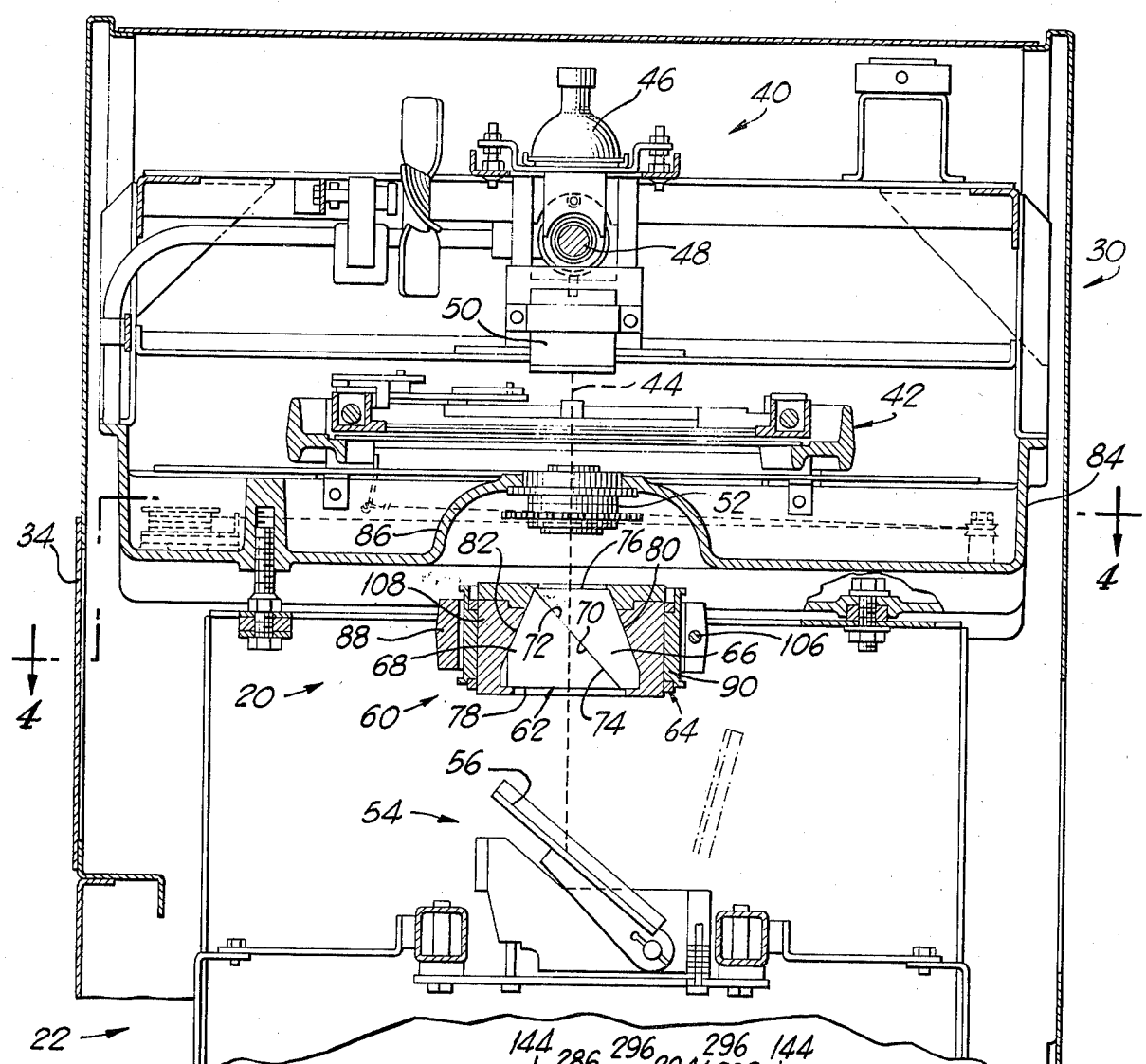
FIG. 3 is an enlarged detailed, partially-elevational and partially-cross-sectional view of a portion of the machine illustrated in FIG. 1 taken along line 3—3 of FIG. 1.
Figure 10:
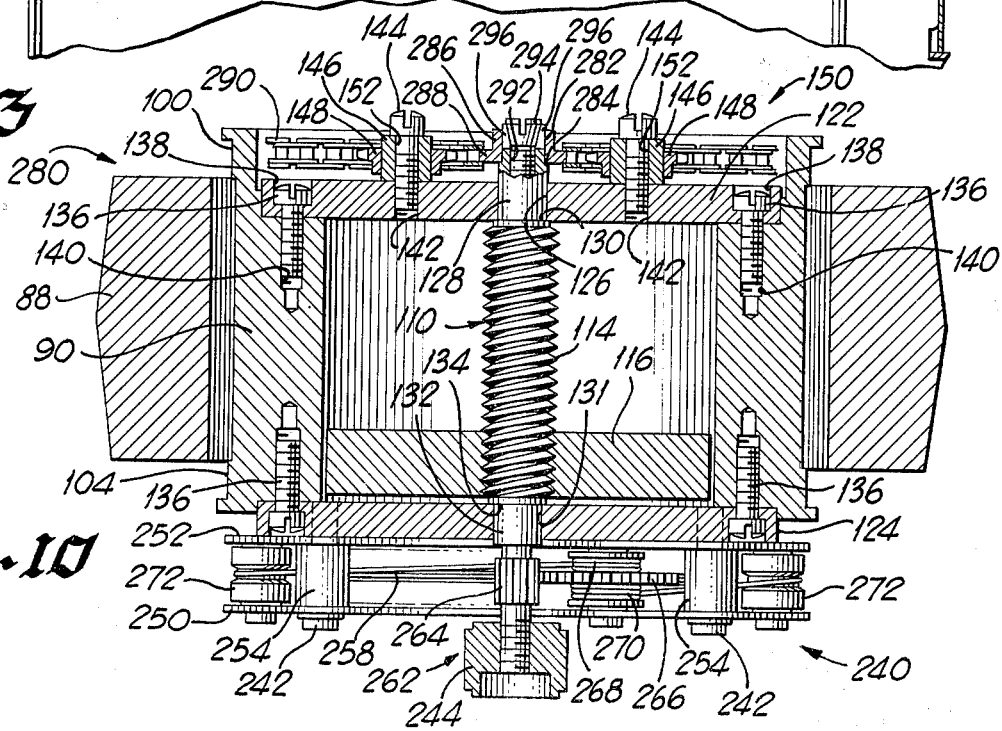
FIG. 10 is a detailed cross-sectional view of the device of the present invention taken along line 10—10 of FIG. 8.

Referring to the drawing, and initially to FIGS. 1–3, a new and improved optical device 20 is provided for angularly adjusting or rotating the image position of projected image in an image plane. In a preferred embodiment, the optical device 20 is utilized in a micro-image viewer-printer machine 22. The machine 22 is preferably the microfiche viewer-printer machine to which the above-identified five co-pending United States patent applications are directed. Alternately, the machine 22 could comprise the microfilm viewer-printer machine disclosed in U.S. Pat. Nos. 3,740,136 and 3,765,758, both of which are assigned to the same assignee as the assignee of the present invention. The disclosures of the U.S. Pat. Nos. 3,740,136 and 3,765,758 are incorporated herein by reference.

The machine 22, which utilizes the new and improved optical device 20 constructed in accordance with the principles of the present invention, enables the selective viewing or rapid reproduction of micro-images stored on a microfiche. The machine 22 includes a viewing or display screen 24 for receiving a projected image of a micro-image stored on a microfiche for viewing by an operator. The machine 22 further includes a printing or reproduction assembly 26, generally disposed behind a pair of access doors 28, for providing paper copies of the micro-images stored on a microfiche.

The machine 22 further includes an optics and transport assembly 30 accessible through a pair of access doors 32 and 34 for illuminating and for positioning micro-images stored on a microfiche. Additionally, the machine 22 includes an operator control panel 36 for controlling the operation of the machine 22 and a receiving tray 38 for receiving paper copies of the micro-images stored on a microfiche.

The optics and transport assembly 30 includes an optics assembly 40 for alternately providing projected images of micro-images stored on a microfiche to the viewing screen 24 or to the printing or reproduction assembly 26. The optics and transport assembly 30 further includes a transport assembly 42 for moving consecutively stored micro-images on a microfiche into and through an illumination path or optical axis 44 of the optics assembly 40.

More specifically, the optics assembly 40 of the machine 22 includes a viewing lamp 46, an exposure lamp 48, a condenser lens assembly 50, a projection lens assembly 52 and the novel optical device 20. The viewing lamp 46 is energized during the viewing portion of the operation of the machine 22. During the printing portion of the operation of the machine 22, the viewing lamp 46 deenergized and the exposure lamp 48 is momentarily energized. The condenser lens assembly 50 receives the radiant energy from either the viewing lamp 46 or the exposure lamp 48 to thereby fully and evenly illuminate a micro-image positioned in the optical axis 44. The projected image of that micro-image is received by the projection lens assembly 52 for transfer to either the viewing screen 24 or the printing or reproduction assembly 26.

A mirror assembly 54 is provided to direct the projected image of a micro-image either to the viewing screen 24 or to permit the projected image to pass to the printing or reproduction assembly 26. In its illustrated solid line position, the mirror assembly 54 transfers the projected image of the micro-image to the viewing screen 24 for viewing or study by an operator. The mirror assembly 54 provides a reflective surface 56 disposed in the optical axis 44 to intercept the projected image of a micro-image and to deflect the projected image to the viewing screen 24. In its dotted line position, the mirror assembly 54 permits the projected image of a micro-image to pass to the printing or reproduction assembly 26.

The projection lens assembly 52 is used to provide the proper magnification or blow-back of a micro-image for display or reproduction by the machine 22 and to enable the proper focusing of an optical image produced by the machine 22. Normally, the operator of the machine 22 is required to change the projection lens assembly 52 when a different magnification or blow-back rate is desired or when a different micro-image size microfiche is inserted into the machine 22 in order to maintain a desired constant magnification or blow-back rate.

The printing assembly 26 of the machine 22 is essentially the same as that fully disclosed and described in the above-identified five co-pending patent applications and in the above-identified two U.S. Pat. Nos. 3,740,136 and 3,765,758. Further, various portions of the printing or reproduction assembly 22 are fully disclosed in the following six United States patents, all assigned to the same assignee as the assignee of the present invention: U.S. Pat. Nos. 3,626,898; 3,653,755; 3,655,282; 3,655,283; 3,663,102; and 3,697,177. The disclosures of the latter six patents are incorporated herein by reference. For a detailed description of the printing or reproduction assembly 26, reference should be had to the above-identified five co-pending patent applications and the above-identified eight United States patents.

2. Pechan Prism

In accordance with an important feature of the present invention, a new and improved optical device 20 is positioned below the projection lens assembly 52 in the optical axis 44 of the optics and transport assembly 30 to receive a projected image of a micro-image from the projection lens assembly and to angularly adjust or rotate the image position of the projected image in an image plane, for example, as formed by the viewing screen 24 or by an exposure station 58 of the printing or reproduction assembly 26.

In a preferred embodiment, the optical device 20 comprises a pechan prism assembly 60. The pechan prism assembly 60 includes a pechan prism 62 and a novel prism mounting assembly 64. The pechan prism 62 is a well-known device, per se. For example, a complete description of a pechan prism is set forth on pages 506 through 510 of Volume 8 of the McGraw-Hill Encyclopedia of Science and Technology published by the McGraw-Hill Book Co., Inc. As disclosed therein, the pechan prism is a rotation-type prism that produces a continuous rotation of an optical field through any angle of rotation. As a pechan prism is rotated about its axis of rotation, an optical image is rotated through twice the angle of rotation of the pechan prism.

The pechan prism 62 (FIGS. 3 and 7) includes two prisms or pechan prism halves 66 and 68 having their hypotenuse faces 70 and 72, respectively, separated by a plane parallel air gap 74. The air gap 74, in a specific embodiment, is formed by an apertured, two-thousandths of an inch (0.002 inch) mask securely positioned between the hypotenuse faces 70 and 72. The pechan prism 62 further includes an incident face 76 for receiving an incident light beam or optical image from the projection lens assembly 52 and an emerging face 78 for directing the emerging rotated light beam or optical image to either the mirror assembly 54 and by reflection to the viewing screen 24 or to the exposure station 58.

An incident light beam from the projection lens assembly 52, representing a projected image of a micro-image in the optical axis 44, upon entering the pechan prism 62 at the incident face 76 is totally reflected at the hypotenuse face 70 and is thereby directed to a silvered or a reflective surface 80. Upon being reflected by the surface 80, the light beam passes through the two hypotenuse faces 70 and 72 and is subsequently internally reflected at the emerging face 78. After being internally reflected by the emerging face 78, the light beam is further reflected by a silvered or reflective surface 82. After being reflected by the silvered or reflective surface 82, the light beam is further reflected by the hypotenuse face 72. Subsequent to its reflection by the hypotenuse face 72, the light beam emerges from the emerging face 78. The emerging light beam or optical image in passing through the pechan prism 62 is rotated in an image plane through twice the angle of rotation of the pechan prism 62 about its axis of rotation which is positioned to be coincident with the optical axis 44. Further, due to the multiple reflections provided by its internal faces and surfaces, the pechan prism 62 provides a very long optical path as compared to the physical dimensions of the prism 62 to thereby enable the overall machine 22 to be physically compact in size.

Other optical devices could be substituted for the pechan prism 62 to enable a light beam or an optical image to be rotated through a desired angle of rotation. For example, a dove or delaborne prism may also be used to rotate an optical field through any desired angle of rotation. However, the dove or delaborne prism does not provide the relatively long optical path discussed above with respect to the pechan prism 62.

3. Prism Mounting Assembly

The optics and transport assembly 30 is generally mounted on and supported in the machine 22 by a base casting 84. The base casting 84 includes a dome-shaped portion 86 for positioning the projection lens assembly 52 in close proximity to the plane of the microfiche supported by the transport assembly 42. In accordance with a further important feature of the present invention, the novel prism mounting assembly 64 enables the pechan prism 62 to be vertically adjusted along the optical axis 44 to place the pechan prism 62 in close proximity to the lower end of the projection lens assembly 52 for receiving a projected image from the projection lens assembly 62) as illustrated in the dotted line portion of FIG. 7). Alternately, the mounting assembly 64 enables the pechan prism 62 to be moved in an opposite vertical direction along the optical axis 44 away from the lower end of the projection lens assembly 52 to thereby remove the pechan prism 62 from the volumetric space circumscribed or defined by the dome-shaped portion 86 of the base casting 84) as illustrated in the solid line portion of FIG. 7). Additionally, the mounting assembly 64 enables the pechan prism 62 to be either securely positioned in the optical axis 44 (as illustrated in the solid line portion of FIG. 4) or to be easily pivotably moved out of the optical axis 44 (as illustrated in the dotted line portion of FIG. 4) to thereby enable the adjustment, repair, removal and replacement of the projection lens assembly 52. Finally, the mounting assembly 64 enables the pechan prism 62 to be controllably manually rotated about its axis of rotation disposed coincident with the optical axis 44 to enable an optical image from the projection lens assembly 52 to be rotated through any desired angle of rotation.

The prism mounting assembly 64 (FIG. 16) includes a pechan prism split housing 88 and a rotatable prism cylinder 90 rotatably disposed within the prism housing 88. The prism cylinder 90 is rotatably securely positioned within the prism housing 88 by a ball bearing assembly 92. In a preferred embodiment, the ball bearing assembly 92 includes six substantially equally spaced ball bearings 94 secured to the upper portion of the prism housing 88 by a plurality of ball bearing mounting pins 96. An outer race 98 of each of the ball bearings 94 is positioned within a circumferential recess or groove 100 of the prism cylinder 90 to thereby physically secure the prism cylinder 90 in an assembled condition to the prism housing 88. The ball bearing assembly 92 includes six additional ball bearings 102 secured to the lower portion of the prism housing 88 and disposed within a lower recess or groove 104 of the prism cylinder 90 to thereby further secure the prism cylinder 90 to the prism housing 88. A ball bearing assembly tensioning screw 106 (FIG. 9) is provided in the prism housing 88 to enable the tension between the ball bearings 94 and 102 and the rotatable prism cylinder 90 to be adjusted to a desired level.

The prism mounting assembly 64 further includes a prism capsule 108 in which the pechan prism 62 is securely disposed. The prism capsule 108 includes a pair of oppositely disposed screw and nut drive assemblies 110 and 112 for providing the longitudinal or vertical adjustment of the prism capsule 108 along the optical axis 44. The drive assembly 110 includes a rotatable driver screw 114 received within a threaded walking nut 116. Similarly, the drive assembly 112 includes a driven screw 118 (FIG. 8) received within a threaded walking nut 120.

The prism capsule 108 (FIG. 16) is fixedly mounted to the prism cylinder 90 by means of an upper mounting plate 122 and a similarly-shaped lower mounting plate 124 (FIG. 8). The upper mounting plate 122 (FIG. 16) includes two apertures 126 having inner diameters just slightly larger than the outer diameters of a pair of unthreaded reduced diameter portions 128 of the screws 114 and 118. Each of the reduced diameter portions 128 includes a lower shoulder portion 130 for engaging the under surface of the upper mounting plate 122.

Similarly, the lower mounting plate 124 includes a pair of apertures 131 for receiving a pair of unthreaded reduced diameter portions 132 forming the lower portions of the screws 114 and 118. Additionally, each of the reduced diameter portions 132 includes a shoulder portion 134 for engaging the upper surface of the lower mounting plate 124. A plurality of four mounting screws 136 (FIG. 6) are positioned in a plurality of four apertures 138 (FIG. 16) and are threadedly received by a plurality of four threaded apertures 140 to securely mount the upper mounting plate 122 to the prism cylinder 90. The lower mounting plate 124 is similarly mounted to the lower portion of the prism cylinder 90. In this manner, the prism capsule 108 is securely mounted to the prism cylinder 90 for rotation with the prism cylinder 90 within the prism housing 88.

Figure 6:
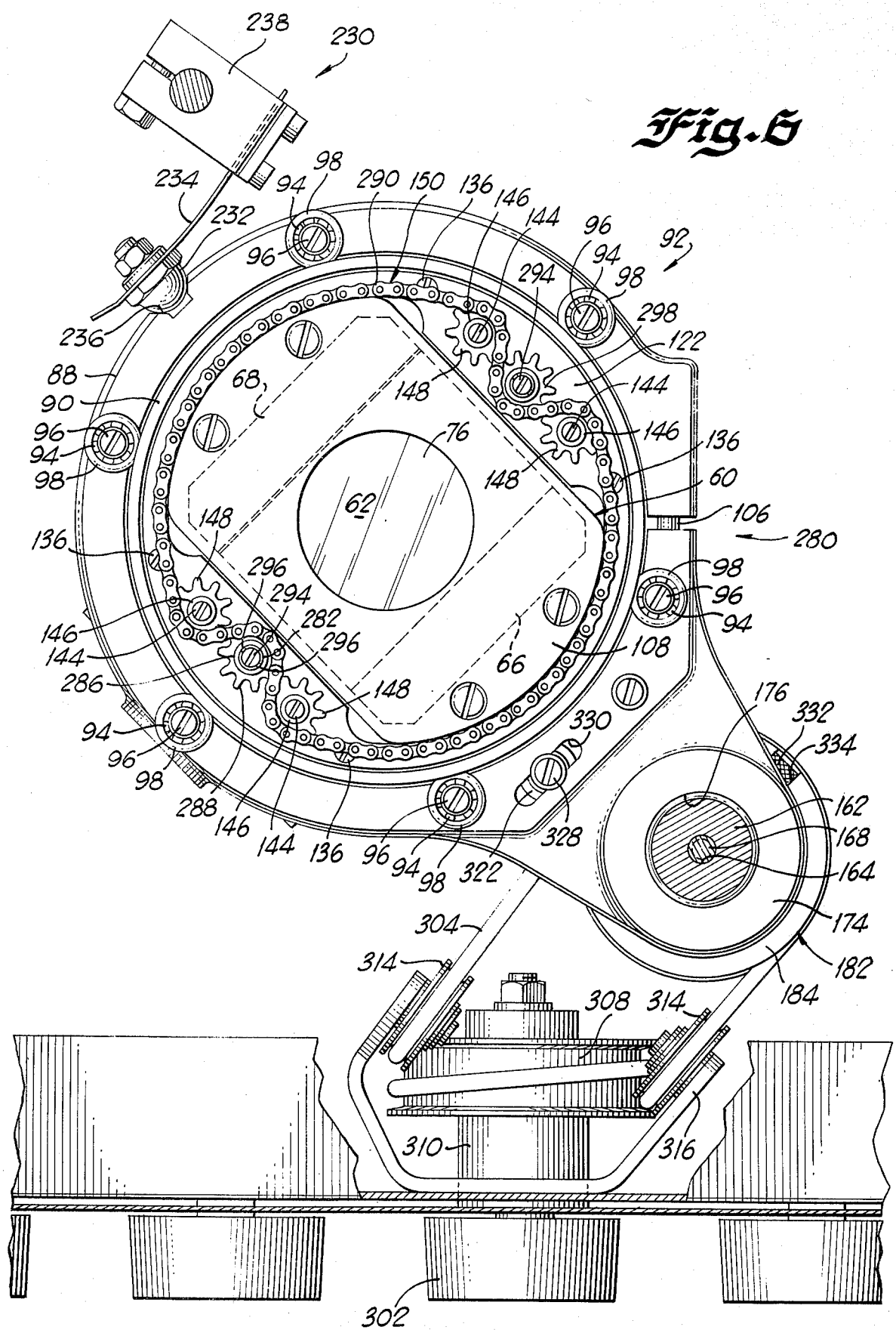
FIG. 6 is a partially-elevational and partially-cross-sectional view of the device of the present invention taken along line 6—6 of FIG. 5.

The upper mounting plate 122 further includes a plurality of threaded apertures 142 for receiving a plurality of threaded locking screws 144 (FIG. 6). The locking screws 144 are used to secure a plurality of four hub portions 146 of a plurality of four idler sprockets 148 of chain drive assembly 150 to the upper mounting plate 122. In a preferred embodiment, the hub portions 146 are eccentrically formed in that a longitudinal aperture 152 of each of the hub portions 146 is disposed off-center to enable the tension on the chain drive assembly 150 afforded by the idler sprockets 148 to be adjusted to a desired level.

Figure 7:
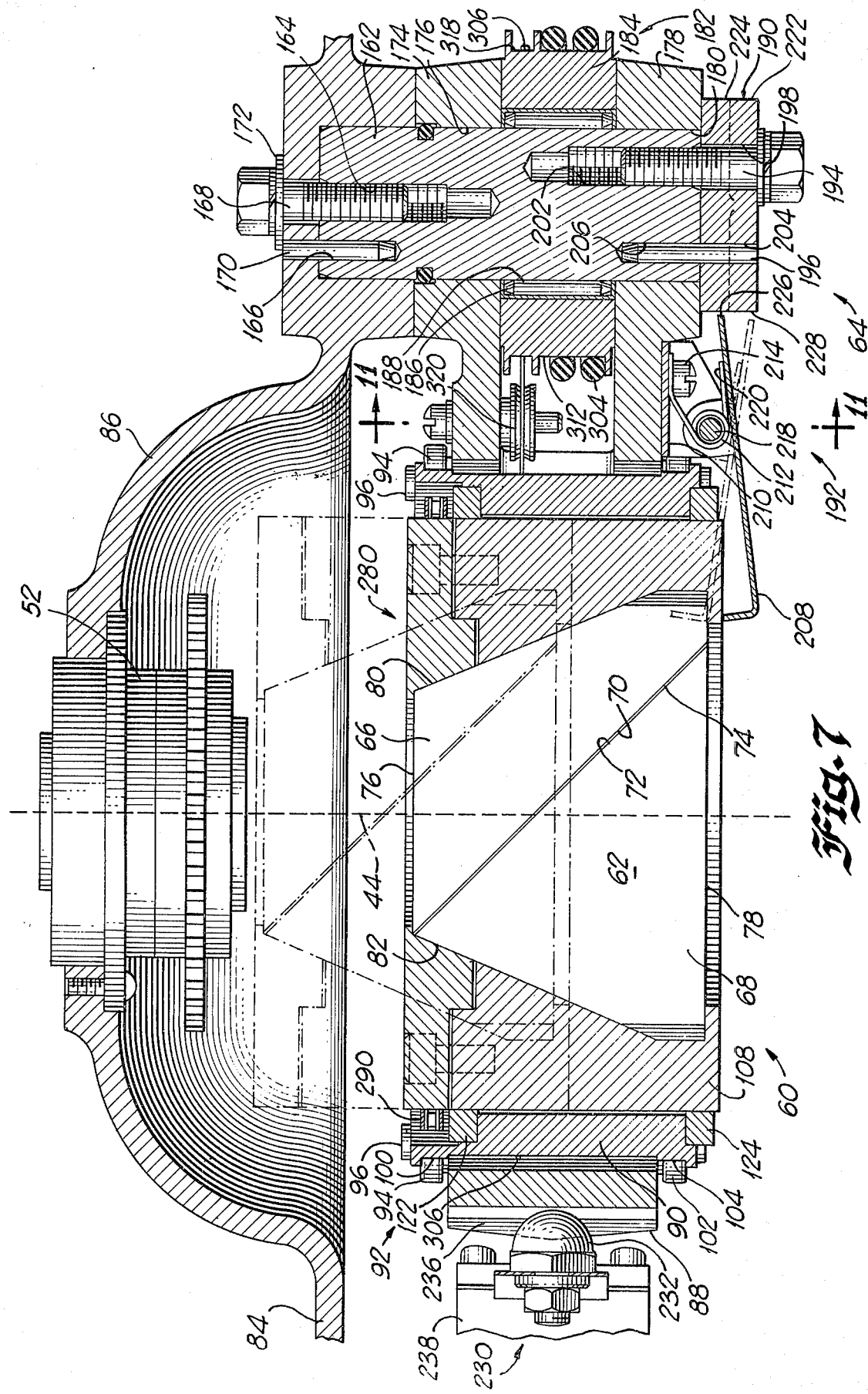
FIG. 7 is an enlarged, partially-elevational and partially cross-sectional view of the device of the present invention taken along line 7—7 of FIG. 4.

The prism mounting assembly 64 further includes a fulcrum and pin assembly 160 about which the prism housing 88 is pivoted to move the prism housing 88, and thus the pechan prism 62, into or out of the optical axis 44. The fulcrum and pin assembly 160 includes a stationary mounting post 162 for mounting the prism mounting assembly 64 to the base casting 84 (FIG. 7). The mounting post 162 comprises a fixed point or fulcrum about which the prism mounting assembly 64 is pivoted in moving the prism mounting assembly 64 into and out of the optical axis 44. The mounting post 162 includes a threaded aperture 164 and an aperture 166 for receiving a mounting bolt 168 and a locking pin 170 to fix the mounting post 162 in a secure, stationary position with respect to the base casting 84. A washer 172 associated with the mounting bolt 168 is used to retain the locking pin 170 in the aperture 166.

The prism housing 88 includes an upper apertured pivot portion 174 having a centrally disposed aperture 176 and a lower apertured pivot portion 178 having a centrally disposed aperture 180 (FIG. 7). Positioned between the pivot portions 174 and 178 is a rotatable wire drum assembly 182. The wire drum assembly 182 includes a tubular wire drum 184 and a centrally disposed needle bearing assembly 186. The wire drum assembly 182 also includes a centrally disposed aperture 188. In mounting the prism mounting assembly 64 to the base casting 84, the mounting post 162 is positioned within the centrally disposed apertures 176, 180 and 188. A retainer 190 of a safety interlock assembly 192 is secured in a stationary position to the lower end of the mounting post 162 by means of a threaded mounting bolt 194 (FIG. 7) and a locking pin 196. The mounting bolt 194 passes through an aperture 198 of the retainer 190 and engages a threaded aperture 202 formed in the lower section of the mounting post 162. Similarly, the locking pin 196 passes through an aperture 204 in the retainer 190 and an aperture 206 in the lower portion of the mounting post 162. The locking pin 196 is retained in the apertures 204 and 206 by any suitable means.

After positioning the mounting post 162 in the apertures 176, 180 and 188 and after securing the retainer 190 to the mounting post 162, the mounting post 162 is secured to the base casting 84 by means of the mounting bolt 168 and the locking pin 170, as described above, to securely mount the prism mounting assembly 64 to the base casting 84.

In accordance with an important feature of the present invention, the safety interlock assembly 192 (FIGS. 7, 11 and 16) prevents the prism housing 88 from being pivotably moved out of the optical axis 44 unless the prism capsule 108 is in its lowermost position (as illustrated in the solid line portion of FIG. 7). If the prism housing 88 were able to be pivotably moved out of the optical axis 44 in either its uppermost position (as illustrated in the dotted line portion of FIG. 7) or in an intermediate position, the prism capsule 108 could possibly be damaged by contacting the dome-shaped portion 86 of the base casting 84.

The safety interlock assembly 192 includes the retainer 190, a spring-biased rotatable pawl 208, a pawl bridge 210 and a spring 212 used to bias the pawl 208 into engagement with the lower portion of the prism capsule 108. The pawl bridge 210 is secured to a lower portion or undersurface of the lower pivot portion 178 by means of a pair of threaded bolts 214 which pass through a pair of elongated apertures 216 in the pawl bridge 210. The spring 212 is disposed about an elongated pivot shaft 218 and has one of its ends secured to one of the pair of threaded bolts 214. A free end 220 of the spring 212 bears against a surface of the pawl 208 to thereby transfer the bias force of the spring 212 to the pawl 208.

The retainer 190 includes a lower polygonally-shaped portion 222 and an upper generally round or circularly-shaped portion 224. When the prism capsule 108 is in its upper position or in an intermediate position, a rear, longitudinally extending edge portion 226 is disposed immediately adjacent an edge surface portion 228 of the lower portion 222 of the retainer 190. In this condition, the prism housing 88 is fixed against pivotal movement about the mounting post 162 since any minor pivotable movement causes the edge portion 226 to engage the edge surface portion 228 and thereby prevents any further pivotal movement. However, when the prism capsule 108 is positioned in its lowermost position, the pawl 208 is pivoted about the pivot shaft 218 to place its rear edge portion 226 adjacent the upper circularly-shaped portion 224 of the retainer 190. In this condition, the prism housing 88 may be freely pivoted about the mounting post 162.

In accordance with a further important feature of the present invention, the pivotal movement of the prism housing 88 about the mounting post 162 and out of the optical axis 44 is further prevented by a detent or locking pin assembly 230 (FIGS. 4–7, and 9). The detent or locking pin assembly 230 preferably includes a generally spherically-shaped detent or locking pin head 232 secured to a spring biased elongated arm 234 and biased thereby to be received within a complimentarily-shaped detent or aperture 236 formed in the prism housing 88. Preferably, the detent or locking pin assembly 230 is adjustably mounted to the base casting 84 by a mounting assembly 238. The mounting assembly 238 is preadjusted to retain the prism housing 88 in a stationary condition in a position in which the axis of rotation of the pechan prism 62 and of the prism cylinder 90 is coincident with the optical axis 44.

In accordance with a further important feature of the present invention, the prism mounting assembly 64 (FIG. 16) further includes an elevational indicator assembly 240 (FIGS. 5, 8, 10 and 13–16) that provides a visual indication of the instantaneous vertical displacement or elevational position of the prism capsule 108. The indicator assembly 240 includes a pair of threaded mounting bolts 242 for securing the indicator assembly 240 to the lower mounting plate 124 (FIG. 14). The indicator assembly 240 further includes an elevational control knob 244 for simultaneously controlling the operation of the elevational indicator assembly 240 and causing the longitudinal or vertical displacement of the prism capsule 108. An upper threaded portion 246 of the control knob 244 is received within a centrally disposed threaded aperture 248 of the driver screw 114. Thus, rotating the control knob 244 causes a corresponding rotation in the driver screw 114.

The elevational indicator assembly 240 includes two, generally symmetrical indicator halves 250 and 252 spaced apart by a plurality of spacers 254. The indicator assembly 240 further includes an indicator or pointer 256 secured to a drive cord 258 by any suitable means, such as by tightening a locking screw 260 after passing the drive cord 258 between the pointer 256 and the locking screw 260.

The drive cord 258 and the pointer 256 are moved by a pinion and drive gear assembly 262. The drive assembly 262 includes a pinion 264 which forms an integral part of the elevational control knob 244. Rotating the control knob 244 and, thereby, the pinion 264 causes a gear 266 to rotate. The gear 266 is fixedly attached to an upper cord drum 268 and a similar lower cord drum 270. The drive cord 258 after passing around a pair of oppositely disposed, idler pulleys 272 is alternately stored and released by the drums 268 and 270. When the indicator or pointer 256 is positioned in its extreme right-hand position (as illustrated in the solid line portions of FIGS. 5 and 13), the elevational indicator assembly 240 provides a visual indication to an operator that the prism capsule 108 is in its lowermost elevational position and that the operator may thus pivotably move the prism housing 88 out of the optical axis 44. When the indicator or pointer 256 is positioned in its extreme left-hand position (as illustrated in the dotted line portions of FIGS. 5 and 13), the elevational indicator assembly 240 provides a visual indication to an operator that the prism capsule 108 is in its uppermost elevational position. Thus, the prism housing 88 may not be pivotably moved out of the optical axis 44.

The prism assembly 108 is elevated to its uppermost position from its lowermost position by rotating the control knob 244 (FIGS. 5 and 13) in a clockwise direction. Rotating the control knob 244 and the pinion 264 in a clockwise direction causes the gear 266 to rotate in a counterclockwise direction and thereby causes a portion of the drive cord 258 previously stored on the upper cord drum 268 to be released while a corresponding portion of the drive cord 256 is taken up or stored by the lower cord drum 270. In this manner, the drive cord 258 is moved to cause the indicator or pointer 256 to move from its solid line position to its dotted line position. The prism capsule 108 is correspondingly moved from its uppermost position to its lowermost position by rotating the elevational control knob 244 in a counterclockwise direction (FIGS. 5 and 13) to cause the gear 266 to rotate in a clockwise direction. When the gear 266 is rotated in a clockwise direction, a portion of the drive cord 258 formally stored on the lower cord drum 270 is released and a corresponding portion of the drive cord 258 is taken up or stored on the upper cord drum 268 to thereby cause the drive cord 258 and the indicator or pointer 256 fixed thereto to move from its dotted line position to its solid line position.

In a particular embodiment, one or both of the indicator halves 252 may bear suitable markings or visual indications to guide an operator in controllably positioning the prism capsule 108 at an intermediate position between the two extreme positions described above to thereby enable the prism capsule 108 to be optimumly positioned with respect to and spaced from projections lens assemblies 52 of different physical lengths.

4. Longitudinal or Vertical Adjustment

In accordance with an important feature of the present invention, the position of the prism capsule 108 and the pechan prism 62 may be longitudinally or vertically adjusted along the optical axis 44 from its solid line position (as illustrated in FIGS. 7 and 8) to its dotted line position (as illustrated in FIGS. 7 and 8) by means of a longitudinal or vertical adjustment control assembly 280 (FIGS. 6–8, 10 and 16). The major components of the control assembly 280 are the elevational control knob 244, the screw and nut drive assembly 110 and the chain drive assembly 150. As described above, the prism capsule 108 may be longitudinally or vertically adjusted in the optical axis 44 by manually rotating the elevational control knob 244. The control knob 244 is fixedly attached to the driver screw 114 to cause the driver screw 114 to be rotated along with the control knob 244. The rotation of the driver screw 114 results in the longitudinal or vertical displacement of the threaded walking nut 116 and thus of the pechan prism 108 integrally attached to the walking nut 116 along the longitudinal threaded portion of the driver screw 114.

The driver screw includes at its upper portion, a recessed diameter portion 282 terminated by a lower shoulder portion 284 for receiving a hub portion 286 of a chain drive sprocket 288 used to drive a stainless steel drive chain 290. The recessed diameter portion 282 includes a centrally disposed threaded aperture 292 for receiving a locking screw 294. The recessed diameter portion 292 is split or includes a plurality of longitudinal slots 296 to enable the tension between the recessed diameter portion 282 and the hub portion 286 to be adjusted by the tightening or the loosening of the locking screw 294. The locking screw 294 is sufficiently tightened to cause the drive sprocket 288 to rotate along with and in the same amount as the rotation of the driver screw 114.

The driven screw 118 includes a chain drive sprocket 298 attached to the driven screw 118 in the same manner as the drive sprocket 288 is attached to the driver screw 114. Thus, the rotation of the drive socket 298 causes a corresponding rotation in the driven screw 118. The rotation of the driven screw 118 causes the longitudinal or vertical displacement or movement of the walking nut 120 along the longitudinal threaded portion of the driven screw 118.

In summary, the manual rotation of the elevational control knob 244 causes a corresponding rotation in the driver screw 114 and the drive sprocket 288. The rotation of the drive sprocket 288 causes the movement of the drive chain 290 about the idler sprockets 148 to cause a corresponding rotation of the drive sprocket 298. The rotation of the drive sprocket 298 results in the rotation of the driven screw 118. In this manner, the prism capsule 108 integrally attached to the walking nuts 116 and 210 and, thus, the pechan prism 62 are longitudinally or vertically moved along the optical axis 44. A visual indication of the direction and of the amount of the movement of the prism capsule 108 along the optical axis 44 is provided by the elevational indicator assembly 240 which also provides a visual indication of the instantaneous longitudinal or vertical position of the prism capsule 108 along the optical axis 44.

5. Pivotal Movement

The prism housing 88 is pivotably movable from a relatively fixed position 88A (FIG. 4) in the optical axis 44 to a freely movable position 88B out of an and away from the optical axis 44 to thereby provide access for the adjustment, repair, removal and replacement of the projection lens assembly 52. The prism housing 88 is pivotably movable about a fulcrum formed by the stationary mounting post 162 (FIGS. 4, 6, 7, 9 and 16). In order to move the prism housing 88 from the position 88A to the position 88B, the prism capsule 108 must be positioned in its lowermost longitudinal or vertical position by means of the elevational control knob 244 and the control assembly 280 to thereby disengage the safety interlock assembly 192. After disengaging the safety interlock assembly 192, the prism housing 88 may be moved from the position 88A to the position 88B by providing a manual force to the prism housing 88 sufficient to disengage the detent or locking pin head 232 of the detent or locking pin assembly 230 from the detent or aperture 236 of the prism housing 88.

The prism housing 88 may be relocated in a correct alignment in the optical axis 44 by pivotably moving the prism housing 88 from the position 88B to the position 88A and by relocating the detent or locking pin head 232 in the detent or aperture 236. Subsequently, the prism housing 88 may be locked in the position 88A by moving the prism capsule 108 from its lowermost position to an intermediate position or to its uppermost position, thereby activating the safety interlock assembly 192.

6. Rotational Adjustment

The pechan prism 62 is rotatably adjustable about an axis of rotation coincident with the optical axis 44 by means of a rotational control assembly 300 (FIGS. 4–7, 9, 11 and 16). The rotation of the pechan prism 62 causes the image position of a projected image of a micro-image to be rotated in an image plane, for example, the plane of the viewing screen 24, through twice the angle of rotation of the pechan prism 62. The rotational control assembly 300 includes as its major components an image rotation control knob 302 (FIGS. 1, 4–6 and 12), the rotatable wire drum assembly 182, the prism cylinder 90 rotatable within the prism housing 88, a polyurethane cable 304 for transferring the rotation of the control knob 302 to the rotatable wire drum assembly 182 and a plastic coated stainless steel cable 306 for transferring the rotation of the wire drum assembly 182 to the rotatable prism cylinder 90.

The rotational control assembly 300 enables the image position of a projected image to be rotated through any desired angle of rotation. For convenience, the control panel 36 and the control knob 302 (FIGS. 1 and 12) include, in a preferred embodiment, visual designations or indications to guide an operator in controlling the rotation of the image position of a projected image through any desired angle of rotation. For example, a manual roation of the control knob 302 from its "0" position to its "180" position causes the image position of a projected image to be rotated in an image plane through an angle of 180°. A 180° rotation of the control knob 302 causes a corresponding 180° rotation of a cable drum 308 fixedly attached to an elongated shaft 310 that extends from the control knob 302. The cable drum 308 is used to receive and impart motion to the cable 304 in response to the movement of the cable drum 308. The cable 304 is directed from the cable drum 308 to a lower drum portion 312 of the tubular wire drum 184 by a pair of pulleys 314 mounted in the machine 22 by suitable means, such as by a bracket assembly 316. Preferably, the pulleys 314 are adjustably mounted to the bracket assembly 316 to enable the tension of the cable 304 to be adjusted to a desired level.

The cable 306 rotates the prism cylinder 90 in response to the rotation of the wire drum 184 by the control knob 302, the cable drum 308 and the cable 304. The cable 306 is received by and moved by an upper drum portion 318 of the wire drum 184. From the upper drum portion 318, the wire 306 is directed by a pair of pulleys 320 and 322 to and around the outer periphery of the rotatable prism cylinder 90. Preferably, at least one of the pulleys, for example the pulley 322, is adjustably mounted to the prism housing 88 to enable the tension of the cable 306 to be adjusted to a desired level. The adjustably mounted pulley 322 is attached to a mounting extension 324 that includes a centrally disposed threaded aperture 326. The aperture 326 receives a threaded locking screw 328 for fixedly mounting the rotatable pulley 322 to the upper apertured pivot portion 174 of the prism housing 88. An elongated slot 330 is provided in the upper apertured pivot portion 174 for receiving the mounting extension 324 and the locking screw 328 and for enabling the distance between the rotatable pulleys 320 and 322 to be adjusted to provide the desired tension to the cable 306.

The two longitudinal end portions of the cable 306 are joined or spliced together by a metal band or splice 332 that is crimped to the longitudinal end portions of the cable 306. Slippage between the cable 306 and the wire drum 184 is prevented by positioning the metal band 332 in a slot or recessed portion 334 of the upper drum portion 318 of the wire drum 184. Similarly, slippage between the cable 306 and the prism cylinder 90 is prevented by fixedly securing the cable 306 to the prism cylinder 90 by means of a locking screw 336. Access through the prism housing 88 to the locking screw 336 is provided by an aperture 338 through the prism housing 88. In addition to preventing slippage, the locking screw 336 enables an operator to preadjust and set the rotational position of the pechan prism 62 in the optical axis 44 to thereby rotate the image position of a projected image in accordance with the setting of the control knob 302.

In a preferred embodiment, the image position of a projected image is rotated through 180 degrees by a 180 degree rotation of the control knob 302. Since a 180 degree rotation of the control knob 302 results in a 180 degree rotation of the cable drum 308, the effective diameter of the outer periphery of the prism cylinder 90 is approximately twice the effective diameter of the cable drum 308. Further, the effective diameters of the lower drum portion 312 and of the upper drum portion 318 of the tubular wire drum 184 are approximately equal to the effective diameter of the cable drum 308. Thus, a 180° rotation of the control knob 302 results in a 90 degree rotation of the pechan prism 62 in the optical axis 44 to thereby rotate the image position of a projected image through 180°. Altering the visual indications or scale associated with the control knob 302 from those illustrated in FIG. 12, may necessitate a corresponding change in the effective diameters of the outer periphery of the prism cylinder 90, of the cable drum 308, of the lower drum portion 312 and of the upper drum portion 318.

Obviously, many modifications and variations of the present invention are possible in light of the above teachings. Thus, it is to be understood that, within the scope of the appended claims, the invention may be practiced otherwise than as specifically described.

What is claimed and desired to be secured by Letters Patent of the United States is:

1. A device for providing a projected image of a micro-image comprising
   an elongated illumination path,
   means for positioning said micro-image in said illumination path,
   means for illuminating said micro-image to form said projected image of said micro-image having a first spatial disposition or image position in an image plane,
   optical means for receiving said projected image and for variably optically altering the spatial disposition or image position of said projected image in said image plane from said first spatial disposition or image position to a second, distinct, spatial disposition or image position in said image plane, said optical means including an axis of rotation,
   a projection lens assembly disposed between said illuminating means and said optical means, and
   means for mounting said optical means along said illumination path in a position to receive said projected image from said projection lens assembly, said mounting means including means for variably adjusting the longitudinal position of said optical means along a portion of said elongated illumination path and means for enabling the movement of said optical means into and out of said illumination path, said enabling means including a stationary member providing a fulcrum or pivot point about which the optical means is pivotably movable into and out of the illumination path and said mounting means including means for impeding the pivotal movement of said optical means when said axis of rotation is substantially coincident with the longitudinal axis of said illumination path.

2. A device as defined in claim 1 wherein said optical means comprises a pechan prism.

3. A device as defined in claim 1 wherein said adjusting means includes a rotatable threaded screw having an elongated threaded portion and a walking nut fixedly secured to said optical means and being movable along said threaded portion in the direction of said illumination path by the rotation of said threaded screw.

4. A device as defined in claim 1 further comprising means actuated by said adjusting means for visually indicating the position of said optical means along said illumination path.

5. A device as defined in claim 4 wherein said indicating means includes a pointer movable along an elongated track, the instantaneous position of said pointer along said track providing a visual indication of the instantaneous position of said optical means along said illumination path.

6. A device as defined in claim 1 wherein said mounting means includes means for rotating said optical means about said axis of rotation substantially parallel to at least an elongated portion of the longitudinal axis of said illumination path to thereby alter said spatial disposition or image position of said projected image from said first spatial disposition or image position to said second spatial disposition or image position.

7. A device as defined in claim 6 wherein said rotating means comprises means for rotating said optical means about said axis of rotation through an angle of rotation of at least ninety degrees.

8. A device as defined in claim 6 wherein said mounting means further includes means for positioning said optical means such that said axis of rotation is substantially coincident with said elongated portion of said longitudinal axis of said illumination path.

9. A device as defined in claim 6 wherein said rotating means includes a cable and drum drive assembly.

10. A device as defined in claim 9 wherein said optical means is fixedly secured to a first mounting member and wherein said first mounting member is mounted for rotation within a second mounting member.

11. A device as defined in claim 10 wherein said cable and drum drive assembly includes a movable cable fixedly secured to said first mounting member and a manually operable control member for moving said cable to cause and control the rotational movement of said first mounting member and of said optical means.

12. A device as defined in claim 6 wherein said mounting means further includes means for variably adjusting the longitudinal position of said optical means along an elongated portion of said illumination path.

13. A device as defined in claim 12 wherein said mounting means further includes means for enabling the movement of said optical means into and out of said illumination path.

14. A device as defined in claim 13 wherein said enabling means includes a stationary member providing a fulcrum or pivot point about which the optical means is pivotably movable into and out of said illumination path.

15. A device for providing a projected image of a micro-image comprising an elongated illumination path, means for positioning said micro-image in said illumination path, means for illuminating said micro-image to form said projected image of said micro-image having a first spatial disposition or image position in an image plane, optical means for receiving said projected image and for variably optically altering the spatial disposition or image position of said projected image in said image plane from said first spatial disposition or image position to a second, distinct, spatial disposition or image position in said image plane, a projection lens assembly disposed between said illuminating means and said optical means and means for mounting said optical means along said illumination path in a position to receive said projected image from said projection lens assembly, said mounting means including means for variably adjusting the longitudinal position of said optical means along a portion of said elongated illumination path and means for enabling the movement of said optical means into and out of said illumination path and means for variably adjusting the longitudinal position of said optical means along said elongated illumination path between a first limit position and a second limit position and means for inhibiting the operation of said enabling means when the longitudinal position of said optical means is greater than a predetermined distance from said second limit position.

16. A device as defined in claim 15 wherein said inhibiting means comprises a spring-biased rotatable pawl having an elongated edge portion alternately associated with a generally linearly extending edge portion of a stationary member and with a generally curved edge portion of said stationary member.

* * * * *